Dec. 31, 1935.  V. E. ACKLES  2,026,203
ICING MECHANISM
Filed July 5, 1934  2 Sheets-Sheet 1
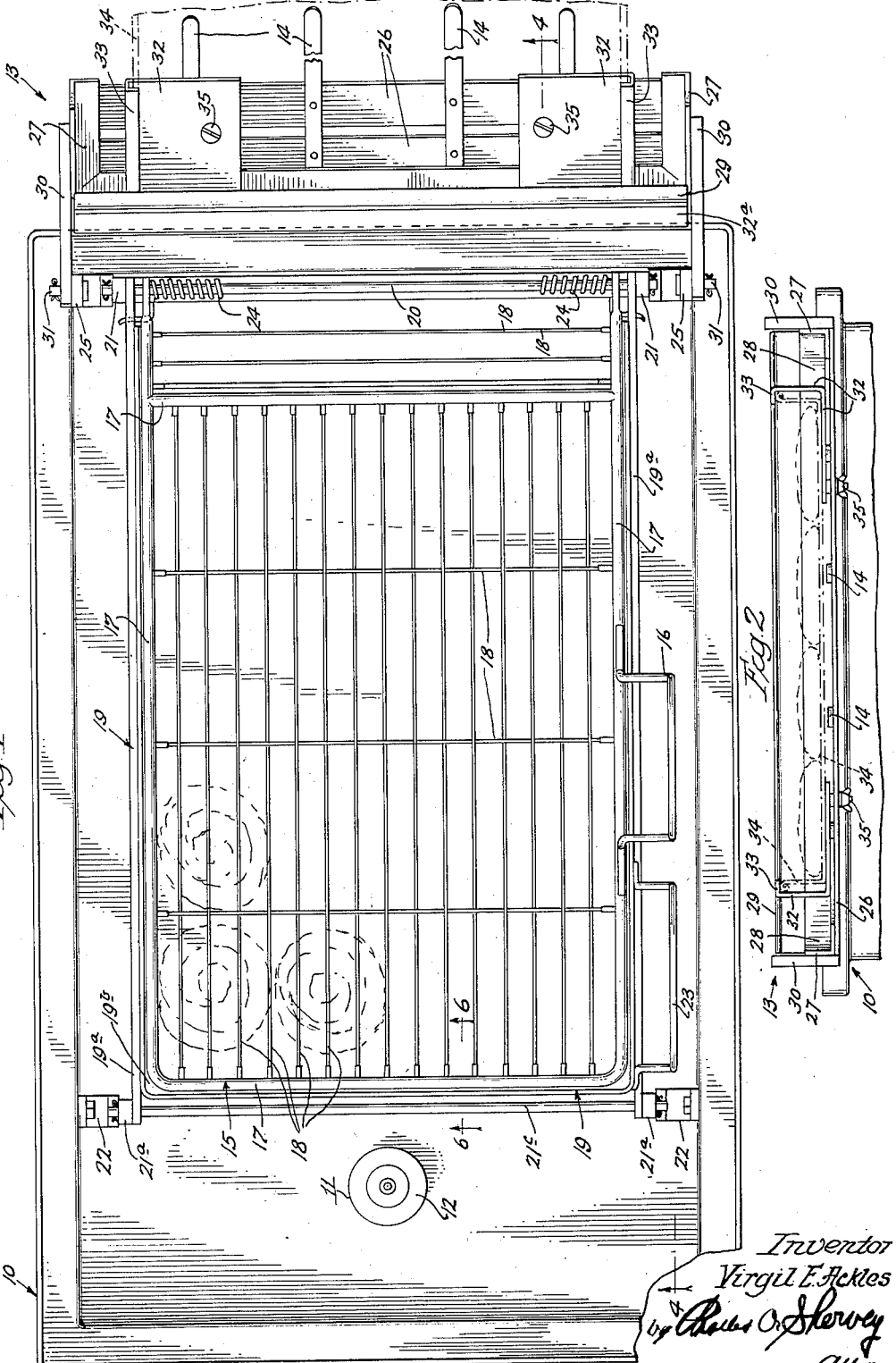

Dec. 31, 1935. V. E. ACKLES 2,026,203
ICING MECHANISM
Filed July 5, 1934 2 Sheets—Sheet 2
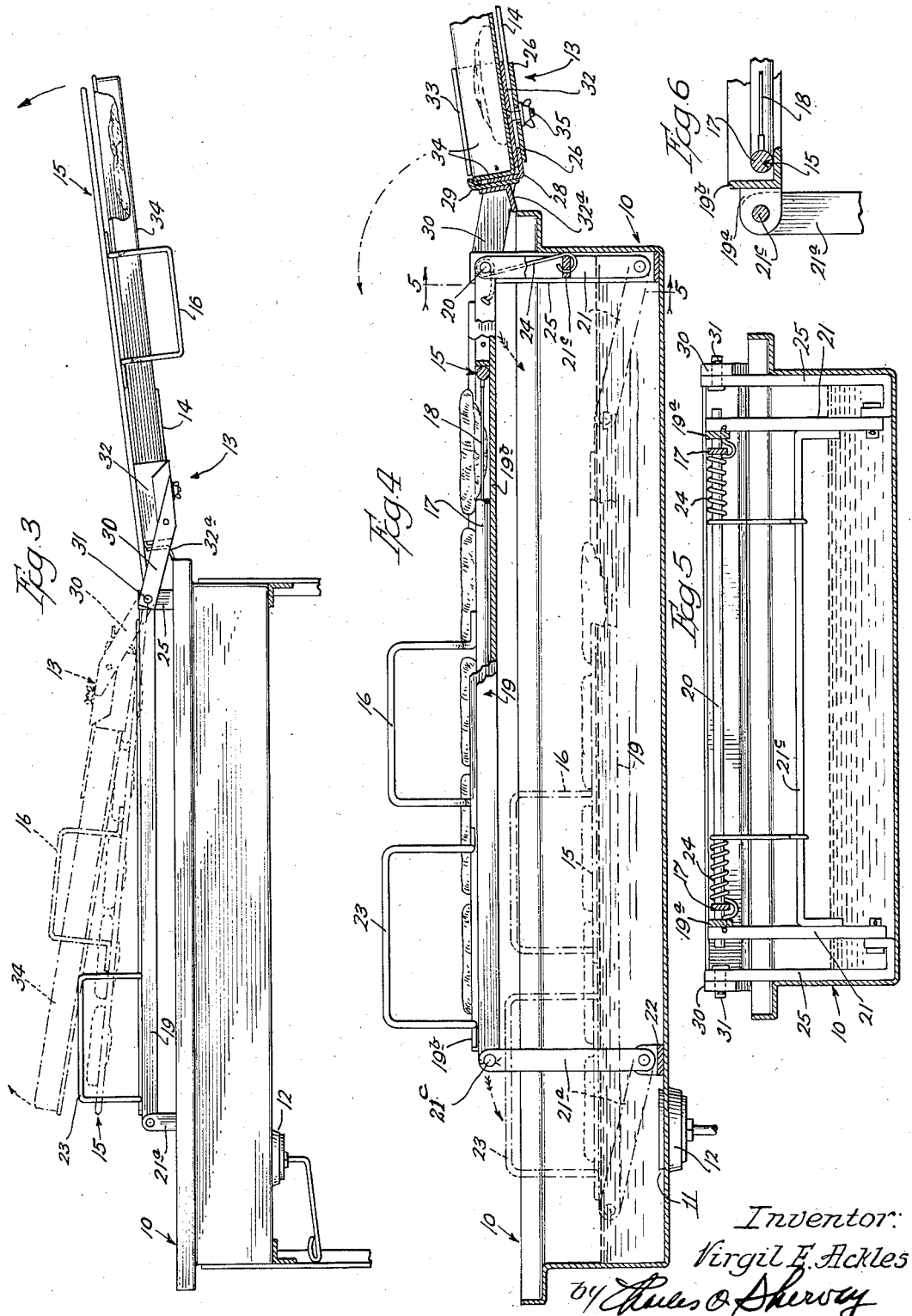
Inventor:
Virgil E. Ackles Patented Dec. 31, 1935

2,026,203

UNITED STATES PATENT OFFICE 2,026,203

ICING MECHANISM

Virgil E. Ackles, Chicago, Ill., assignor to Ackles-Hornkohl Company, Chicago, Ill., a corporation of Illinois Application July 5, 1934, Serial No. 733,765

9 Claims. (Cl. 91—4)

This invention relates to icing mechanism and its principal object is to provide novel mechanism adapted for use by workmen to apply icing or frosting to bakery goods. Another object is to provide means in icing mechanism, whereby a filled pan of bakery goods may be inverted, and the contents of the pan dipped into a bath of icing material and thereafter returned to the pan. Another object is to provide a simple, efficient and practical icing mechanism which is easily manipulated and does not require the services of skilled workmen to operate.

With these and other objects and advantages in view, this invention consists in the several novel features hereinafter fully set forth and claimed.

The invention is clearly illustrated in the accompanying drawings, in which:

Fig. 1 is a plan of an icing apparatus embodying a simple form of the present invention;

Fig. 2 is an end elevation of a certain baking pan holder and a fragment of the icing pan;

Fig. 3 is a side elevation, showing a baking pan supported by the baking pan holder, and illustrating the baking pan and holder and a drainer, in dotted lines, in inverted position over the icing pan;

Fig. 4 is a vertical longitudinal section taken on the line 4—4 of Fig. 1 showing the drainer with the bakery goods thereon in solid lines, and showing in dotted lines the same parts with the bakery goods partially immersed in icing material;

Fig. 5 is a cross-section taken on the line 5—5 of Fig. 4, and

Fig. 6 is a detail vertical longitudinal section taken on the line 6—6 of Fig. 1.

Referring to said drawings, which are illustrative of one embodiment of the invention, the reference character 10 designates an icing pan in which liquid icing material is contained, there being a drain opening 11 at one end closed by a plug or stopper 12. The icing pan may of course be supported by a suitable stand or frame in convenient position for manipulation. Desirably the icing pan is of rectangular form and is of such internal dimensions that the ordinary baking pan (used by bakers in baking coffee cake, rolls, doughnuts, biscuits, small cakes and the like) may be contained within the confines of the icing pan.

At one end of the icing pan, a swinging baking pan holder 13 is pivotally mounted on posts 25 secured to the icing pan and capable of being swung from the position seen in solid lines in Fig. 3 to that seen in dotted lines in said figure. Desirably the baking pan holder comprises two bars 26 with a slot therebetween secured at their ends to angle iron end bars 27, an angle iron back bar 28, a flanged back bar 29 and arms 30 all secured together in any desirable manner. The arms are pivoted to the posts 25 by pins 31, and an angle iron bar 32ª may be provided on the back bar 28 to abut against the icing pan to hold the baking pan holder in its extended position.

Adjustably mounted on the bars 26 are two pan holding plates 32 the opposite outer sides of which are bent upward and then toward each other to form lips 33 that are adapted to overlie the edges of a baking pan 34 and thereby clasp it upon the baking pan holder whereby the pan may be securely swung back and forth between the positions shown in solid and dotted lines in Fig. 3. Adjustment screws 35 extending through the plates 32 and through the slot between the bars 26, together with wing nuts, provide means for securing the plates 32 in any position of adjustment. Fingers 14 fastened to the bars 26 may be provided to serve as bracket extensions to support the baking pan.

Mounted in the icing pan for movement into and out of the icing material is a drainer 15 upon which the baking goods are placed during the dipping operation, and said drainer is pivotally mounted on a rod 20 co-axial with the pivots of the baking pan holder, whereby it may be swung from a horizontal position over the icing material, to a position over and parallel with the baking pan 34 (see Fig. 3) for the purpose of receiving the bakery goods therefrom. A handle 16 is provided along one edge of the drainer, which handle is taken hold of by the workman when manipulating the drainer. It is to be understood that after a filled baking pan has been inserted into the baking pan holder, the drainer is raised from the icing pan and swung over and down upon the bakery goods in the baking pan, after which the baking pan, together with the drainer, with the bakery goods confined therebetween, are swung over the icing pan and the baking pan is thereafter swung back into its former position, leaving the bakery goods in inverted position upon the drainer.

The drainer is desirably composed of a rectangular frame 17, across which are stretched wires 18 suitably spaced apart. The frame 17 is of substantially the same area as the area of the baking pan whereby it may receive all of the bakery goods from the pan when the latter is inverted over the drainer.

Associated with the drainer is a rectangular dipping frame 19 desirably composed of two side bars 19ª and an angle iron strip 19ᵇ, which strip provides a seat or rest for the drainer. The latter is pivotally mounted, as by the rod 20, upon upstanding arms 21 located at the end of the dipping frame adjacent the baking pan holder and normally the drainer rests on the ledge formed by the horizontal flanges of the angle iron strip of the dipping frame.

The dipping frame is pivotally mounted on the swinging arms 21 and 21ª, which are located at the corners thereof, and the arms are pivotally mounted adjacent the bottom of the icing pan on the posts 25 and on brackets 22 which are riveted or otherwise fastened to the sides of the pan. The rods 21ᶜ and 20 and rivets form the pivotal connections between the arms 21, 21ª and the dipping frame 19 and icing pan 10. A handle 23, secured along one edge of the dipping frame, adjacent the handle 16, is provided for manipulating the dipping frame and springs 24 are provided for yieldably holding the dipping frame, and therewith the drainer in their raised position in the icing pan. Desirably the springs 24 are coiled around the rod 20 with their ends in engagement with the dipping frame and with a cross bar 21ᶜ which connects the swinging arms 21.

In the operation of the icing mechanism the icing pan is partly filled with suitable liquid icing or frosting material and the dipping frame and drainer are normally held above the level thereof. The workman inserts the end of a filled baking pan into the baking pan holder and swings the drainer down upon the contents thereof. He then swings both the baking pan and drainer (with the contents held therebetween) down upon the dipping frame, and swings the baking pan back to its former position, leaving the bakery goods upon the drainer in inverted position. He then depresses the drainer and dipping frame until the bakery goods are partly or wholly immersed as the case may be and when he releases the downward pressure on the handles, the springs raise the dipping frame and therewith the drainer and the iced bakery goods. He then swings the baking pan down upon the iced bakery goods and swings the drainer together with the baking pan with the iced bakery goods therebetween back to the original position and swings the drainer back upon the dipping frame. The baking pan is then removed.

From the above it is apparent that great quantities of bakery goods can be iced quickly and with little effort, and that all of the goods in a pan are iced uniformly.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. Icing mechanism, comprising in combination an icing pan for containing icing, an invertible holder pivotally mounted on the icing pan and arranged to carry a baking pan, an invertible and depressible drainer co-operating with a baking pan carried by the holder to retain the contents of the baking pan therein, a depressible drainer supporting means upon which the drainer is pivoted, said drainer supporting means having parallel movement means whereby the drainer supporting means, and therewith the drainer, may be depressed into the icing while held in a horizontal position.

2. Icing mechanism, comprising in combination an icing pan for containing icing, an oscillatory holder pivotally mounted on the icing pan and arranged to carry a baking pan, an oscillatory and depressible drainer co-operating with a baking pan carried by the holder to retain the contents of the pan therein, and a depressible drainer supporting frame upon which the drainer is pivoted, said frame having parallel movement means whereby the frame, and therewith the drainer, may be depressed into the icing while held in a horizontal position.

3. Icing mechanism, comprising in combination an icing pan for containing icing, an oscillatory holder pivotally mounted on the icing pan and movable from a position at one side of the icing pan to one over the same, said holder being arranged to carry a baking pan, an oscillatory and depressible drainer pivotally mounted on the same axis as the axis of the holder and movable from a position over the icing pan to a position over a baking pan held by a holder, the holder, baking pan and drainer being movable together to a position over the icing pan with the contents of the baking pan inverted upon the drainer, and a parallel movement support means for the drainer, whereby the drainer may be depressed, while held horizontal, to thereby partially immerse the goods into the icing material.

4. Icing mechanism, comprising an icing pan, a dipping frame therein, supporting means for the dipping frame, comprising parallel, swingable arms located at the ends of the frame and pivotally connected to the icing pan and dipping frame, a spring engaging dipping frame acting to yieldably hold the same in elevated position, and a drainer mounted on said frame.

5. Icing mechanism comprising an icing pan, a dipping frame therein, oscillatory arms at the two ends of the frame pivotally mounted in the icing pan and pivotally connected to the dipping frame, a spring engaging the dipping frame and acting to yieldably hold the same in an elevated position, a drainer pivotally mounted on the dipping frame and being depressible therewith, and a baking pan holder pivotally mounted on the icing pan on an axis concentric with the axis of the drainer and acting to hold a baking pan while being swung from one position to another.

6. Icing mechanism, comprising an ice pan for containing icing, a holder pivotally mounted on the icing pan and arranged to carry a baking pan, a depressible dipping frame in the icing pan, swinging arms at the ends of the dipping frame pivotally connecting the icing pan with the dipping frame, resilient means to hold the dipping frame in elevated position, and a drainer pivotally mounted on the dipping frame on an axis co-axial with the pivots of the holder.

7. Icing mechanism, comprising in combination an icing pan adapted to contain icing material, depressible drainer supporting means in said pan, comprising parallel, swinging arms and a horizontal frame carried thereby, an invertible and depressible drainer swingably mounted on said frame and capable of lying horizontally thereon, a holder co-operating with said drainer to hold a baking pan against the drainer while the same is being inverted, and resilient means to yieldably hold the drainer supporting means and therewith the drainer in raised position above the icing material.

8. Icing mechanism, comprising in combination an icing pan adapted to contain icing material, depressible drainer supporting means in said pan, comprising parallel, swinging arms and a horizontal frame carried thereby, an invertible and depressible drainer swingably mounted on said frame and capable of lying horizontally thereon, resilient means to yieldably hold the drainer supporting frame in raised position above the icing material, and means co-operating with the drainer for inverting bakery goods thereupon.

9. Icing mechanism, comprising in combination an icing pan, a depressible drainer supporting frame, parallel arms pivotally mounted in the pan and pivotally connected to the frame, an invertible, swingable drainer fulcrumed upon the frame, a swingable holder arranged to carry a baking pan, and pivotally mounted on an axis, which is coaxial with the axis of the drainer, whereby to swing parallel with the drainer, and pan holding plates adjustably mounted on said holder.

VIRGIL E. ACKLES.